United States Patent [19]
Mrotek et al.

[11] Patent Number: 5,424,148
[45] Date of Patent: Jun. 13, 1995

[54] HIGH PERFORMANCE BATTERY CAST-ON STRAP

[75] Inventors: Edward N. Mrotek, Grafton; Dennis L. Marshall, New Berlin; David A. Thuerk, Brookfield; Wen-Hong Kao, Brown Deer, all of Wis.

[73] Assignee: Globe-Union, Inc., Milwaukee, Wis.

[21] Appl. No.: 126,546

[22] Filed: Sep. 27, 1993

Related U.S. Application Data

[63] Continuation-in-part of Ser. No. 948,171, Sep. 21, 1992, Pat. No. 5,308,719.

[51] Int. Cl.6 .............................................. H01M 2/24
[52] U.S. Cl. ..................................... 429/158; 429/160
[58] Field of Search ................................ 429/158, 160

[56] References Cited

U.S. PATENT DOCUMENTS

| | | | |
|---|---|---|---|
| 1,882,414 | 10/1932 | Ford | 429/160 |
| 3,579,386 | 5/1971 | Tiegel et al. | 429/160 |
| 3,600,232 | 8/1971 | Daguenet | 429/160 |
| 4,800,142 | 1/1989 | Bish et al. | 429/160 X |
| 5,149,605 | 9/1992 | Dougherty | 429/160 |
| 5,244,756 | 9/1993 | Mix et al. | 429/160 |

FOREIGN PATENT DOCUMENTS

| | | |
|---|---|---|
| 0545293A1 | 6/1993 | European Pat. Off. |
| 0553431A1 | 8/1993 | European Pat. Off. |
| 2267643 | 11/1975 | France |
| 1114332 | 5/1968 | United Kingdom |
| 2170348 | 7/1986 | United Kingdom |

Primary Examiner—Stephen Kalafut
Attorney, Agent, or Firm—Foley & Lardner

[57] ABSTRACT

A cast-on strap for use in connecting current collecting lugs in battery systems is disclosed. In the most preferred embodiment, the invention includes a caston strap formed of electrically conductive material, such as lead, having a first elongate portion in electrical contact with a line of spaced apart battery plate lugs. The connector strap includes a second portion lying in a plane which is perpendicular to that of the elongate portion so that the latter is laterally displaced. The preferred cast-on strap also includes an angularly extending portion between the elongate portion and the second portion. Increased current transfer efficiency is achieved using the strap of the present invention.

11 Claims, 3 Drawing Sheets

HIGH PERFORMANCE BATTERY CAST-ON STRAP

CROSS-REFERENCES TO RELATED APPLICATIONS

This application is a continuation-in-part of U.S. patent application Ser. No. 07/948,171, filed on Sep. 21, 1992 by Mrotek, et al. and entitled, "Lead-Acid Batteries Containing Center Lug Plates and High Performance Cast-On Straps," now U.S. Pat. No. 5,308,719, such application being owned by the assignee of the present application.

BACKGROUND OF THE INVENTION

1. Field of the Invention

The present invention relates generally to the field of lead-acid batteries, and more particularly, to a unique, high performance per unit weight cast-on strap. The strap permits design modifications in battery preparation, such as alteration in plate size, plate count and the potential for elimination of costly and heavy plates from battery plate stacks. More specifically, the present invention relates to the field of cast-on straps which have a low profile and which are highly efficient in transferring current to another caston strap in another cell of the battery.

2. Description of Prior Battery Systems

Lead-acid batteries typically comprise a series of thin, flat, generally rectangular grids for carrying a current through the battery. The grids also serve as a substrate for supporting electrochemically active materials or "paste" added thereto during manufacture to form battery plates. Paste typically comprises a mixture of lead oxide in a dilute acid solution, for example sulfuric acid. The paste composition is determined by power requirements, cost and the battery environment, as is generally known in the art.

It is also known that groupings of individual battery plates may be assembled, interleaved with separator material and electrically connected to form plate stacks. The latter are then assembled in a container to form a final battery. A typical example would be an automobile battery of the 12-volt variety, where six individual stacks are placed into a plastic container having six compartments. To permit current to flow throughout the battery, it is necessary to join the straps of one stack with the appropriate strap of an adjacent stack. Moreover, it is necessary to provide terminal electrodes which will extend through the cover to permit electrical contact with the vehicle's electrical system.

After the battery plates are fully assembled, they are formed, i.e. charged, and the battery is placed into service. An important characteristic of batteries is called "cold cranking power," i.e. the amount of power which can be generated per unit of time. Further reference will be made to cold cranking power in later sections of this specification.

The parent application describes in detail certain prior art relating to the construction of the grids themselves, including the use of screen-like patterns having a plurality of holes into which the porous chemical paste is applied, cured, etc. The parent application also describes the typical offset current collecting lugs extending from each plate, which lugs are eventually coupled by the cast-on straps to complete the electrical circuit. Most commonly, cast-on straps are formed by taking assembled battery plate stacks, inverting them, and dipping the lugs of the stack into molten lead contained within a mold. In the most common batteries in use at the time of the filing of this specification, cast-on straps have an upstanding end portion, as will be explained later and more fully when the drawings are described later herein. The upstanding portion of such cast-on straps have come to be known as the "tombstone" of the straps.

In the parent application, a considerable portion of the specification was devoted to a discussion of grid design which will not be repeated in this application. However, such discussion is expressly incorporated herein by this reference. Moreover, several patents showing cast-on straps or burned-on straps having designs different than the typical tombstone design are within the art and will be described here. For example, in commonly owned U.S. Pat. No. 5,149,605, issued Sep. 22, 1992, Dougherty describes a cast-on strap which is used with a novel dual lug battery plate design, the straps including a pair of spaced apart elongate portions extending in one plane and a laterally extending portion extending in a plane perpendicular to that of the elongate portions. The laterally extending portions, in the Dougherty patent, couple the two elongate portions joining rows of lugs of like polarity.

A different type of strap construction is described in U.K. Patent Application No. 2170348A, published Jul. 30, 1986. This application is entitled, "Storage Battery", and the subject matter thereof was invented by Shiga, et al. The strap of this patent is used with battery plates of conventional design, i.e. those having current collector lugs adjacent the corners of the plates, and the straps include a horizontal base portion and an "ear" portion extending from the horizontal base portion and facing a perforation hole in the wall between plate stacks. The design is for burned-on straps and is said to reduce the height of the conductor or the lugs of the negative or positive plates.

While it is apparent from the foregoing description that numerous plate and grid designs have been developed in the lead-acid battery art, problems still remain in the design and manufacture of such batteries. One of the most significant is the weight associated with this type of energy source. Commercial battery plates include lead alloy grid materials, combined with lead paste materials and the electrolyte. Any system which would reduce the battery weight, while maintaining the power required for a particular application, would be a significant advance in the art.

Further problems relate to the actual manufacture of the batteries, where the plates must be electrically coupled by the cast-on straps and where the straps must be welded to one another in adjacent cells to permit current to flow through the system. Ways in which such current transfer could be increased in efficiency would also represent significant advances.

Furthermore, it is always advantageous to seek ways to maximize the efficiency of the grid-strap current transfer and improvements in this area would also be important.

Any system which would combine solutions to the foregoing problems would represent a further very substantial advance in this technology.

SUMMARY OF THE INVENTION

The present invention features a novel cast-on strap for batteries which could be used for either the positive or negative plates or both. The present invention also provides a cast-on strap which is readily adaptable for use with lugs of the conventional design (located offset from the center of the grid) or with the center lug plates disclosed in the parent application.

The present invention also features a cast-on strap with dramatically improved current carrying efficiency.

The combination of the cast-on straps of the present invention with the center lug grids of the parent application results in an optimized construction, such that it may be possible to eliminate one or more plates from each plate stack (keeping the same performance) or to reduce the height of the existing plates, thereby providing substantial material savings. Also, utilizing the optimized benefits can result in a reduction in battery weight with only a minimal reduction in reserve capacity. On the other hand, plates may be modified in size so that an increased reserve capacity can be achieved in a battery having the same weight as in prior designs. Moreover, with the cast-on straps of the present invention, higher manufacturing speed can be achieved, leading to less capital and storage costs due to a lower plate count.

Another important feature of the present invention is the ability to increase the efficiency of the welding process used for the in-line welding of the straps in adjacent cells. Jaw alignment is simplified from what would be required for use with tombstone cast-on straps presently in use.

Other features of the invention and other ways in which the present invention provides the features will become apparent to one skilled in the art after reading the following detailed description of a particularly preferred embodiment.

DETAILED DESCRIPTION OF THE DRAWINGS

In the various FIGURES, like reference numerals are used to identify like components.

DETAILED DESCRIPTION OF THE MOST PREFERRED EMBODIMENTS

Before proceeding to the detailed description of the preferred embodiments of the present invention, several comments would be appropriate with regard to the applicability and scope thereof.

First, several terms will be used throughout the remainder of the specification which should be defined in this introduction. The term "plate" will be used to refer to the positive or negative combinations of active paste material and battery grids, while the term "stack" will refer to a combination of a plurality of positive and negative plates which are assembled (with separators) for insertion into a battery compartment, such as a cell of a multi-stack battery.

The term "cast-on strap" as used herein means the strap of conductive material used to combine and electrically interconnect the current collector lugs of like polarity within a stack. "Terminal electrodes" are the positive and negative electrodes which are typically found in the end compartments of a battery. Such terminal electrodes typically include a strap and a portion which may extend either through the top, front or side of the battery, depending on particular battery design.

While materials do not, in and of themselves, form part of the invention, the cast-on straps with which this specification is most related are typically prepared from lead and are added to a battery stack in a single operation. Following assembly of a plurality of stacks into the number needed for the final battery, they are grasped by equipment which will allow the inversion of the plurality of stacks and the insertion of the lugs into molds containing liquid lead. Following cooling, the stack is removed, at which time the various straps are solid and attached to the lugs.

Figure 3:
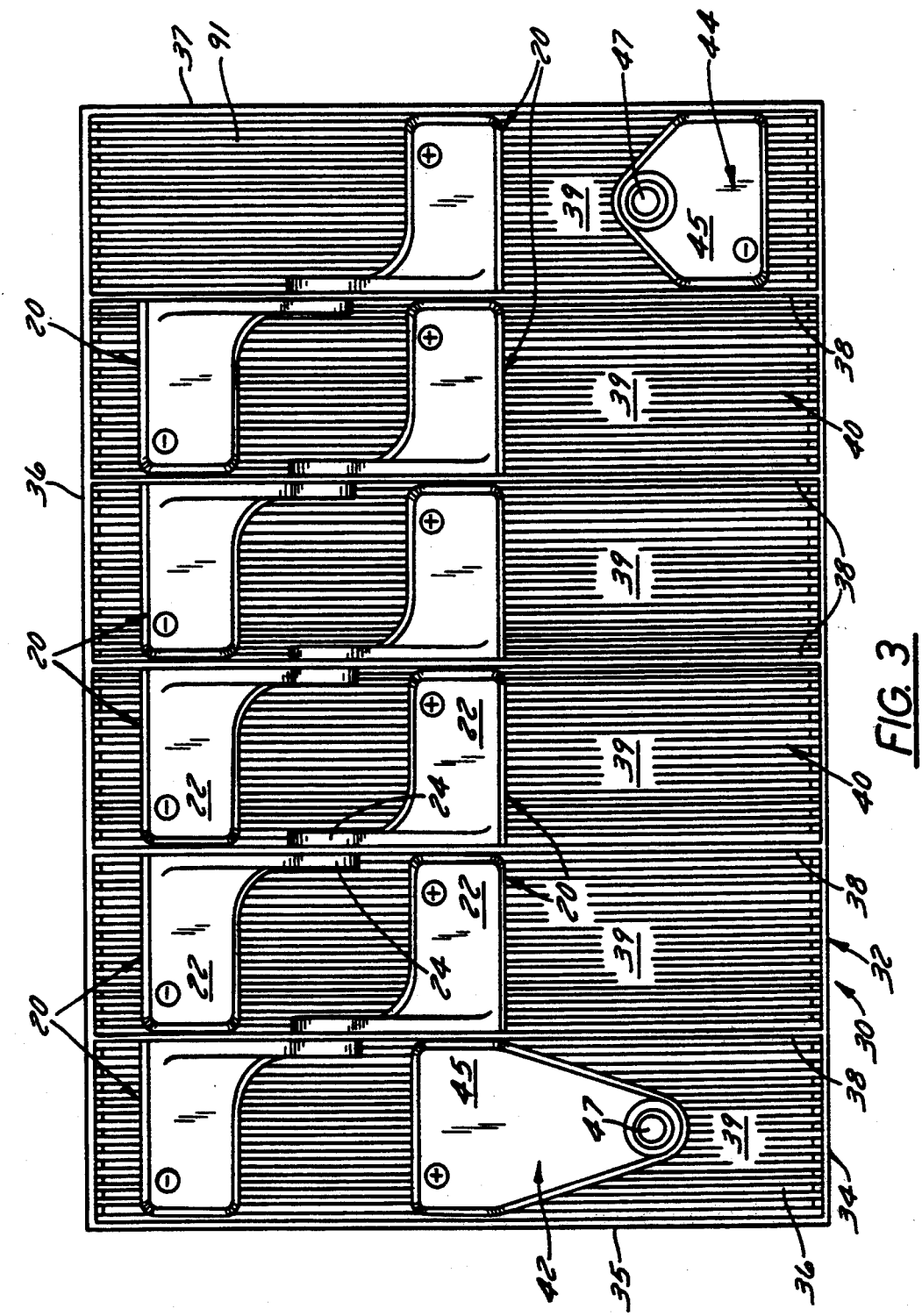
FIG. 3 is a top plan view of a six-compartment battery using the cast-on strap embodiment illustrated in FIGS. 2A-C and showing positive and negative terminal electrodes.
Figure 4D:
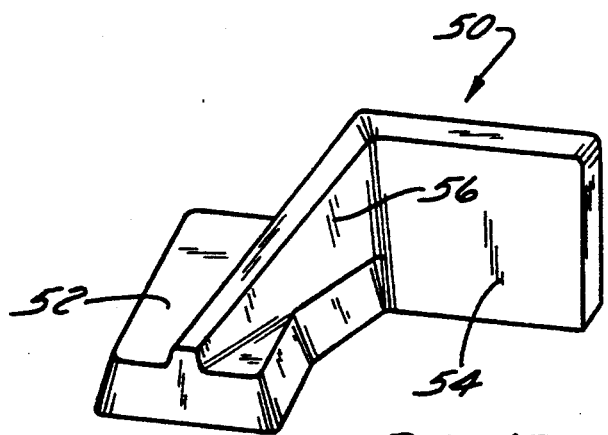
FIG. 4D is a perspective view of the cast-on strap shown in FIGS. 4A-C.
Figure 4B:
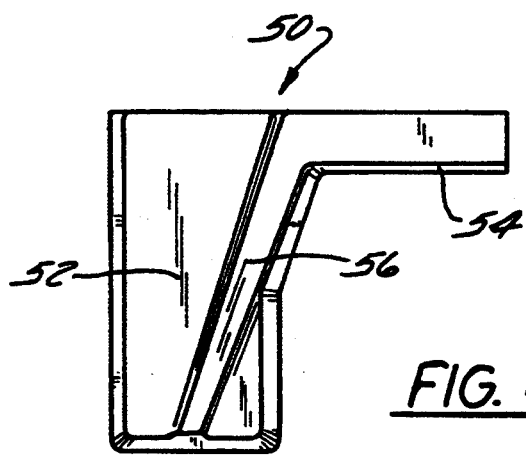
FIG. 4B is a top view of the cast-on strap shown in FIG. 4A.
Figure 4A:
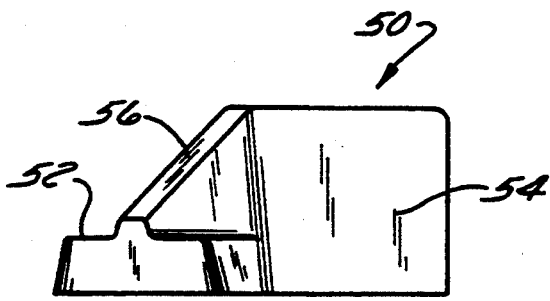
FIG. 4A is a front elevation view of a cast-on strap according to the most preferred form of the present invention.
Figure 4C:
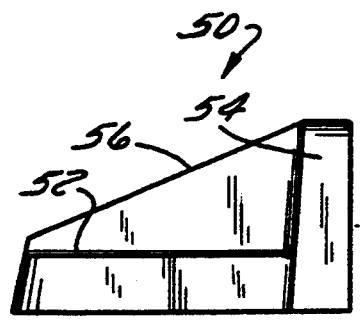
FIG. 4C is a side elevation view of the cast-on strap shown in FIG. 4A.

Various casing materials for batteries are also known in the art, typically the outer container being a resin as shown in FIG. 3. Such casings have a plurality of cell dividers and a cover (not shown herein) which can include several other components, like vent caps, explosion attenuation devices, and the like. Accordingly, while some reference may be made to materials, this invention relates primarily to the arrangement of parts and novel designs for the straps.

Also, before leaving this section of the specification, it should be mentioned that the size of the various components can be varied widely utilizing the principles described herein. The illustrations are for batteries used in automobiles, where typically groups of 12-15 plates are used in each of six stacks for producing a 12-volt battery. It will be obvious to those skilled in the art after reading the specification that the size of the individual grids, the number of plates in any particular stack, and the number of stacks used to construct the battery may vary widely depending on the desired end use.

More specifically with regard to the present invention, it should be apparent that the strap designs to be described herein may be used with a variety of grid constructions, including those having a radial type of wire arrangement, rectilinear grids, or other grid designs known in the art. While it is believed that the present invention has greatest applicability to the center lug construction described and claimed in the parent of this application, it is equally applicable to grid and lug configurations such as those shown in the two patents referred to in the background section of this specification. Accordingly, the illustrated versions are not to be taken as limiting, as the invention has much wider applicability. The design of the strap is of significant importance for purposes of this application, and the principles hereof may be readily adapted after the principles are understood by those skilled in the art.

Finally, before proceeding to a description of the FIGURES showing prior art strap designs and the straps of the present invention, it may be helpful to understand in this description that what is referred to as the "elongate" portion is that portion which is used to electrically interconnect the lugs of plates of like polarity within a stack. For clarity, it may then be explained that this portion is typically formed in a mold cavity which is filled with molten lead. The plates, when they are inverted so that the lugs extend downwardly, are lowered so that only the lugs enter the molten bath of lead, following which cooling takes place. The battery stacks are then removed with the elongate portion of the strap attached to the lugs. Portions in addition to the elongate portion will be illustrated and described herein.

Figure 1A:
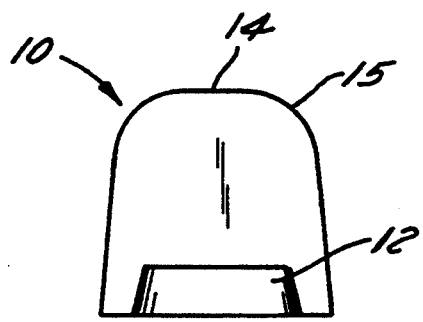
FIG. 1A is a front elevation view of a prior art "tombstone" cast-on strap design.
Figure 1B:
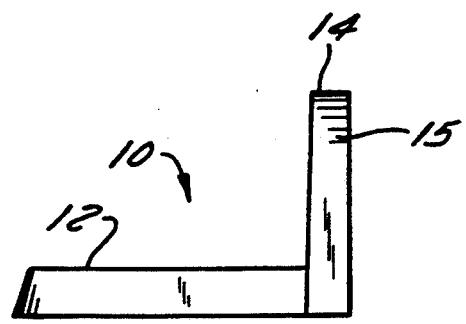
FIG. 1B is a side elevation view of the prior art strap shown in FIG. 1A.

FIGS. 1A and 1B show in front elevation and side views a typical, prior art cast-on strap 10 of the "tombstone" variety. Rather than show the mold from which they are made, these views are shown, and it should be evident from the description of this point that the actual straps would be coupled to collector lugs since they are formed integrally therearound. Cast-on straps 10 generally include a rectangular, elongate body portion 12 which will have a length sufficient to be electrically coupled to each lug in a row of a battery plate stack. Cast-on straps 10 also include a vertically extending portion 14 at one end of strap 10, portion 14 having a rounded top 15 so that the overall appearance of end portion 14 is similar to that of a tombstone. In this prior art device, the body portion 12 will lie in a generally horizontal plane when the final battery is assembled, while portion 14 will lie in a vertical plane perpendicular to that of the plane of portion 12 and intersecting same.

Straps 10 will be reversed in orientation for the positive and the negative lugs, so that the vertical portions 14 will be at opposite ends of a stack. It will also be recognized by those familiar with this art that portions 14 will be arranged to fit snugly against the dividing walls of the battery casing (not shown) so that portion 14 of one stack connecting positive plate lugs can be electrically fused through the partition wall to portion 14 of a strap coupling negative plate lugs in an adjoining cell. Such coupling is accomplished in present battery making technology using weld jaws which extend downwardly over the pair of portions 14 and which are clamped together to perform the welding operation. Considerable care must be exercised during such welding operation, because if the jaws are lowered too far, they will contact portions 12 of the straps 10 and may result in a misaligned and/or defective weld.

Figure 2B:
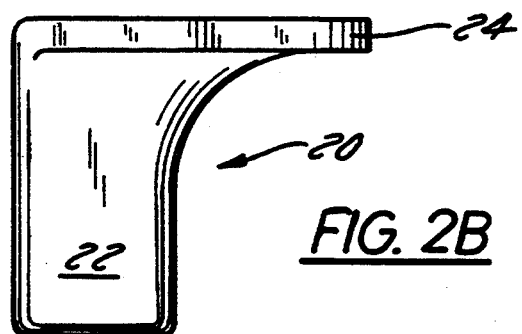
FIG. 2B is a top elevation view of the cast-on strap shown in FIG. 2A.
Figure 2A:
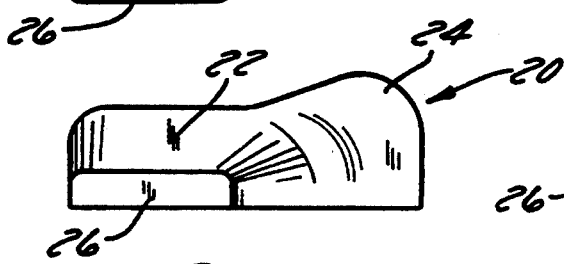
FIG. 2A is a front elevation view of a cast-on strap design according to one form of the present invention.
Figure 2C:
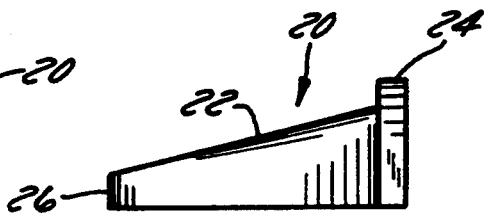
FIG. 2C is a side elevation view of the cast-on strap shown in FIG. 2A.

Proceeding next to the description of FIGS. 2A–2C, cast-on straps according to one aspect of the present invention are illustrated. These straps 20 have a different configuration and are also shown without the collector lugs.

Straps 20 include an elongate body portion 22 having a first end 26 and a length equal to or greater than the length of the row of lugs which it is designed to interconnect. At the second end of body portion 22, a laterally projecting extension 24 is formed. By comparing FIGS. 1A–1B and FIGS. 2A–2C, it will be noted that the overall height of the cast-on straps of the present invention are lower and that the tombstone appearance has been radically altered. The use of lower profile straps permits taller plates to be used, adding to the flexibility of battery design attainable with the present invention.

The straps illustrated in these FIGURES indicate that between end 26 and the end of body portion 22 adjacent lateral extension 24, additional lead is provided which extends both upwardly and angularly toward the lateral projection and that the cross-sectional area of the body portion 22 gradually increases from end 26 toward the extension 24.

In practice, two cast-on straps 20 would be used for each battery stack (except the end stacks), one with plates having a row of lugs, preferably down the center of the plates, and one with plates of the opposite having lugs offset from the center. The straps 20 are arranged in such a manner that the lateral projections 24 extend into the area defined by the two lug rows of such a stack.

The end stacks would contain only a single one of the straps 20 and a further strap for the terminal electrodes, as will be described now in connection with FIG. 3.

FIG. 3 shows, in top elevation and somewhat schematic form, a battery 30 prepared according to one embodiment of the present invention. Individual plates are not shown in detail and the battery cover and its associated components have been removed from the drawing to facilitate explanation of the components which form the most preferred aspect of the invention. Again, it should be mentioned that the illustrated plates include a center lug for the positive plates and an offset lug for the negative plates, as will be readily appreciated once this FIGURE is further explained.

Battery 30 includes a compartment 32 having a front wall 34, end walls 35 and 37, a rear wall 36, and a bottom (not shown). Located between end walls 35 and 37 are five cell partition walls 38, resulting in the formation of six compartments 39, as would be typical in a 12-volt automotive battery. A plate stack 40 is located in each compartment 39, each stack 40 being comprised of a plurality of positive and negative plates, with separator material placed therebetween. In the illustration, the positive plate lugs are arranged at the center line of the battery. The negative plate lugs are located nearer the rear wall 36, except for stack 91 in an end compartment, where the negative plate lugs are located nearer front wall 34. This reversal is shown merely to permit the terminal electrode to be located on the same side of the battery as the terminal electrode at the opposite end.

FIG. 3 clearly shows how the cast-on straps 20 are located within the battery compartment and how they alternate in mirror image form so that the lateral extensions 24 of straps 20 form a single line down the battery in the area between body portions 22 of strap 20. It can also be appreciated, by reference to this FIGURE, that the welding operation can more easily be accomplished using cast-on straps 20, and that jaw alignment is easier to achieve, and that there is less possibility for damage to straps or plates because portions 24 are spaced above the tops of the plates.

FIG. 3 also illustrates the cast-on straps 42 and 44 provided, respectively, for the positive and negative terminal electrodes. These straps each include a portion 45 coupling the respective lugs in the end compartments and a post 47 to protrude, in this illustrative embodiment, through the cover (not shown). In many instances, the orientation of the terminal electrode will be dictated by the design parameters of the battery itself, and top posts, side posts and other post designs are all known and would be readily adapted by one skilled in the art after reading the present specification. Straps 42 and 44 are not fused to straps in adjacent cells.

A variety of terminal arrangements are possible using the grid and strap arrangement of the present invention. These possibilities arise because of the non-symmetrical lug arrangement, including the center line arrangement as illustrated in FIG. 3.

An alternate and most preferred form of the present invention is shown in FIGS. 4A–4D, wherein a cast-on strap 50 is shown to include an elongate body portion 52 and a lateral projection 54. Body portion 52, when the battery is assembled, will lie in a generally horizontal plane, while lateral projection 54 extends in a vertical plane. The lateral projection is offset from the elongate portion. In this embodiment, a "flag" 56 couples the portions 52 and 54. The flag 56 is generally triangular in shape and extends from the projection 54 toward the end of elongate portion 52 remote therefrom. As the distance from projection 54 increases, the height of the flag decreases until it merges into the top surface of portion 52. While the exact angle that the flag 56 makes between the lateral projection and the elongate portion is not critical to the present invention, changes in the angle do have a significant bearing on the current transfer efficiency of the strap 50. The objective is to reduce ohmic losses and the heat buildup which occurs at the interface of the weld area between adjacent portions 54. In comparing devices which do not include a flag versus those that do, it would be readily appreciated that the weight of the straps would be increased. However, testing has indicated that the internal resistance dramatically decreases while the efficiency, as measured in grams times voltage, also increases. For example, in an early test using a strap design which included an elongate body and a lateral projection, but without any type of flag, the voltage obtained during testing was 0.072, the amps/in$^2$ was 14,225, and the strap weighed 92.5 grams. The grams times voltage was 6.66. In using similar testing for the strap 50 shown in the illustrations of this application, the voltage was measured at 0.041, the amps/in$^2$ was 7616, the weight was 115.3 g and the grams times voltage was 4.76.

The overall results obtained by using the improved cast-on straps of the present invention include efficiency gains related to lower internal resistance and conducting strap and weld areas, a reduction in the amperes/in$^2$ in the weld area, an ability to simplify the weld jaw alignment during battery manufacture, providing a lower weld profile and variable thickness when compared to the standard straps which have been used, and greater flexibility in allowing the positive plate lug to be moved to the center of the battery for improved performance and efficiency.

While the present invention has been described in connection with certain preferred embodiments, it is not be limited thereby but is to be limited solely by the claims which follow.

What is claimed is:

1. A cast-on strap for electrically coupling a row of current collector lugs extending from battery plates comprising:
    an elongate body portion having a first side which receives the lugs, the first side lying in a first plane, the body portion having first and second ends and a center line extending between the first and second ends;
    a laterally extending portion at the second end of the elongate body portion and lying in a second plane generally perpendicular to the first plane and to the center line, the extending portion having an upper portion higher than the body portion and being laterally displaced with respect to the center line; and
    another portion integrally connected to and extending at least partially across the side of the body portion opposite that of the first side and extending to and being integrally connected with the upper portion of the laterally extending portion.

2. The strap of claim 1 wherein said another portion generally increases in cross-sectional area from the first end of the body portion to the laterally extending portion.

3. The strap of claim 1 wherein said another portion is an upright portion lying in a plane perpendicular to the first plane and angularly arranged between the first end of the body portion and the upper portion of the laterally extending portion.

4. The strap of claim 3 wherein the upright portion is generally triangular having its sides in contact with the elongate body portion and the laterally extending portion and its hypotenuse extending generally from a location near the first end of the body portion to the upper portion of the laterally extending portion.

5. The strap of claim 4 wherein the upright portion extends across the corner formed by the elongate portion and the laterally extending portion.

6. A battery plate stack having a pair of parallel rows of current collector lugs and a pair of cast-on straps electrically coupling the collector lugs of each row, each cast-on strap comprising:
    an elongate body portion having a first side which receives the lugs, the first side lying in a first plane, the body portion having first and second ends and a center line extending between the first and second ends;
    a laterally extending portion at the second end of the elongate body portion and lying in a second plane generally perpendicular to the first plane and to the center line, the extending portion having an upper portion higher than the body portion and the extending portion being laterally displaced with respect to the center line; and
    another portion integrally connected to and extending at least partially across the side of the body portion opposite that of the first side and extending to and being integrally connected with the upper portion of the laterally extending portion;
    and wherein the laterally extending portions of the two straps are located at opposite ends of the stack.

7. The straps of claim 6 wherein said another portion generally increases in cross-sectional area from the first end of the body portion to the laterally extending portion.

8. The strap of claim 6 wherein said another portion is an upright portion lying in a plane perpendicular to the first plane and angularly arranged between the first end of the body portion and the upper portion of the laterally extending portion.

9. A battery comprising a plurality of plate-containing compartments defined by partitions, each compartment including a plurality of positive and negative battery plates, current collector lugs extending from the battery plates, the lugs of the positive plates being located in a first row and the lugs of the negative plates lying in a parallel and spaced apart row, the two rows of collector lugs in a compartment being coupled by a pair of cast-on straps as set forth in claim 1, the laterally extending portions of the two straps arranged at opposite sides of the compartments and arranged so that a part of the laterally extending portion of the strap coupling positive plate lugs in one compartment is aligned with a part of the laterally extending portion of a strap coupling negative plate lugs in an adjoining compartment, and a weld is formed through the partition to electrically couple the adjoining laterally extending portions.

10. The battery of claim 9, wherein said another portion comprises an integral portion which generally increases in cross-sectional area from the first end of the body portion to the laterally extending portion.

11. The battery of claim 9, wherein said another portion is an upright portion lying in a plane perpendicular to the first plane and arranged between the first end of the body portion and the upper portion of the laterally extending portion and wherein said another portion is integrally connected with both the body portion and the laterally extending portion.

* * * * *